(12) United States Patent
Hill

(10) Patent No.: US 6,236,981 B1
(45) Date of Patent: May 22, 2001

(54) TRANSACTION SYSTEM

(75) Inventor: Jake Hill, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/972,013

(22) Filed: Nov. 17, 1997

(30) Foreign Application Priority Data

Nov. 20, 1996 (GB) .................................................. 9624127

(51) Int. Cl.[7] .................................................. G06F 17/60
(52) U.S. Cl. ........................ 705/67; 705/67; 705/65; 380/46; 713/170; 713/172; 713/184
(58) Field of Search .................................. 705/1, 39, 23, 705/44, 24, 40, 45, 66, 67, 65; 380/23, 21, 24, 25, 22

(56) References Cited

U.S. PATENT DOCUMENTS

| | | | | |
|---|---|---|---|---|
| 4,918,728 | * | 4/1990 | Matyas et al. | 380/21 |
| 5,200,999 | * | 4/1993 | Matyas et al. | 380/25 |
| 5,206,905 | * | 4/1993 | Lee et al. | 380/4 |
| 5,224,162 | * | 6/1993 | Okamoto et al. | 380/24 |
| 5,276,738 | * | 1/1994 | Hirsch | 380/46 |
| 5,371,796 | * | 12/1994 | Avarne | 380/23 |
| 5,452,358 | * | 9/1995 | Normille et al. | 380/24 |
| 5,511,121 | * | 4/1996 | Yacobi | 380/24 |
| 5,557,518 | * | 9/1996 | Rosen | 364/408 |
| 5,577,121 | * | 11/1996 | Davis et al. | 380/24 |
| 5,600,720 | * | 2/1997 | Iwamura et al. | 380/1 |
| 5,677,955 | * | 10/1997 | Doggett et al. | 380/24 |
| 5,682,474 | * | 10/1997 | Hsu | 395/186 |
| 5,696,827 | * | 12/1997 | Brands | 380/30 |
| 5,869,826 | * | 2/1999 | Eleftheriou | 235/380 |
| 5,870,473 | * | 2/1999 | Boesch et al. | 580/21 |
| 5,878,138 | * | 3/1999 | Yacobi | 380/24 |
| 5,889,862 | * | 3/1999 | Ohta et al. | 380/24 |
| 5,889,863 | * | 3/1999 | Weber | 380/25 |
| 5,892,211 | * | 3/1999 | Davis et al. | 235/380 |

FOREIGN PATENT DOCUMENTS

573245 A2 * 8/1993 (EP) .................................. H04I/9/32

OTHER PUBLICATIONS

Scalable, Secure Cash Payment for WWW Resources with the PayMe Protocol Set, Michael Peirce, Donal O'Mahoney, http:www.w3journal.com/1/omahony.228/paper/228.htm, Jun. 1997.*

NetCheque, NetCash, and the Characteristics of Internet Payment Services, B. Clifford Neuman and Gennady Medvinsky, http://www.press.umich.edu/jep/work/NeumNetPay.htm, 1995.*

Achieving Electronic Privancy, David Chaum, http://193.170.69.2/crypto/chaumcry.htm, Aug. 1992.*

Requirements for Network Payment: The NetCheque Perspective, B. Clifford Neuman, Gennady Medvinsky, Mar. 1995.*

A Framework for Micropayment Evaluation, Carsten Schimidt and Rudolf Muller, http://mmm.wiwi.hu-berlin.de/IMI/micropayments.htm, Jun. 1997.*

* cited by examiner

Primary Examiner—James P. Trammell
Assistant Examiner—Yehdega Retta
(74) Attorney, Agent, or Firm—Nixon & Vanderhye P.C.

(57) ABSTRACT

In a digital payment system, a sequence of random numbers is stored at a payment service. A set of digitally encoded random numbers derived from the stored sequence is issued to the user in return for payment. The tokens are stored in a Carnet. The user can then spend the tokens by transferring tokens to a merchant, for example, to an on-line service provider. The merchant returns each token received to the payment server. The payment server authenticates the token and transmits an authentication message to the merchant. The merchant, payment server and user may be linked by internet connections.

20 Claims, 6 Drawing Sheets

TRANSACTION SYSTEM

BACKGROUND OF THE INVENTION

1. Field of the Invention

The present invention relates to a digital payment transaction system.

2. Related Art

With the growth and commercialisation of the internet, there has been an increasing need for technologies to allow payments to be made on-line. For transactions of relatively high financial value this need is adequately met, for example, by systems using electronic cheques issued by a trusted party such as a bank. Such electronic cheques are typically validated by a signature which is encrypted using a public key algorithm such as RSA. There is however a significant computational overhead associated with the use of such algorithms. Therefore, just as in real life a cheque is unlikely to be acceptable for a purchase of small value because of the associated transaction costs, so also in electronic commerce, electronic cheques are not suitable for payments of low value.

A number of proposals have been made for alternative transaction systems suitable for making the so-called "micropayments" required by low-value transactions. However, it has proved technically difficult to provide the low processing overheads required for any micropayment technology whilst maintaining an adequate level of security.

One example of a previous proposal for a micropayment system is that developed by the US corporation Digital and known as "Millicent". This system is described by its proponents as a lightweight protocol suitable for supporting purchases costing less than a cent. It is based on decentralised validation of electronic cash at the vendor's server. The digital payment tokens in this system are termed "scrip". They are issued by a central payment service in return for prepayment using a conventional payment method such as a credit card. The vendor may then accept scrip from the user in payment for goods or more typically for services. The vendor generates fresh scrip and returns it to the user as change for the transaction. The scrip is authenticated and fresh scrip generated by the vendor using a hash function. This represents a potential security weakness, in that if the hash function is cracked, then the scrip would be open to forgery and duplication. Moreover, there is a processing overhead associated with the use of the hash function by the vendor. Although this is less than the overhead associated, for example, with the use of a PGP-encrypted signature, it is nonetheless a significant limitation. It is admitted by the proponents of the Millicent system that, as a result of its limited efficiency, there is a practical lower bound to the transaction values it can handle. It is suggested that this lower bound is around 1/10 of a cent. Millicent is therefore not suitable for use, for example, as a charging mechanism for internet usage. The costs of packet transmission on the internet have been estimated at around 1/600 th of a cent.

European patent application EP-A-0507669 discloses an example of another type of payment system, based on smart card technology. Here, rather than cryptographic security being relied upon, security is based on the physical integrity of the card. A randomly selected sub-set of a number of token values is withheld, so that the presence of one of the withheld token values in a subsequent transaction can serve as an indication of attempted fraud. The set of tokens issued to a particular card is not statistically random but may, for example, all fall within a limited range of numerical values, and may be ordered in sequence determined by their numerical values.

SUMMARY OF THE INVENTION

According to a first aspect of the present invention, there is provided a method of operating a digital payment transaction system comprising:

a) storing at a payment server a sequence of random numbers;

b) issuing to a user a set of digital payment tokens comprising a sequence of digitally encoded random numbers derived from the said stored sequence of random numbers;

c) transferring a payment token from the user to a merchant platform;

d) transferring from the merchant platform to the payment server the payment token received from the user in step (c);

e) at the payment server, authenticating the token by comparing the value of the random number of the token from the merchant platform and a value derived from a corresponding position in the stored sequence of random numbers; and f) subsequently communicating an authentication message from the payment server to the merchant platform.

The present invention provides a digital payment transaction system which offers improved efficiency and security and which is suitable for making micropayments, including very low value payments. This is achieved by issuing to the user a "carnet" or set of digital payment tokens which comprises a set of random numbers in a determined sequence. The numbers in the sequence are completely unrelated to one another, and there is no correlation between the numerical value of a token and its position in the sequence. This is in contrast with prior art proposals in which the tokens are related to one another by cryptographic transforms. The tokens are validated by passing them to the payment server where the token is compared with the corresponding number in the random sequence stored at the server. In this way, the system offers a high level of cryptographic security, while completely removing the processing overhead from the vendor.

In the description and claims the term "random" is used to encompass both truly random numbers and pseudo-random numbers which match, to within a required level of accuracy, the statistical properties of a truly random sequence.

Preferably the payment server is remote from the merchant platform and the merchant platform communicates over a communications network with the payment server. Typically, although not necessarily, all three of the user, the merchant and the payment server will be linked by internet connections.

Preferably the set of digital payment tokens is derived from the sequence of random numbers stored at the payment server by selecting part of the said sequence and encoding the said part of the sequence with a key which is specific to the user.

Generating the carnet by encrypting part of the random sequence using a user-specific key ensures that the required length of the random number sequence, and the associated storage needed in the payment server, scales acceptably as the number of users increases. At the same time, encryption with the user key further enhances the security of the method.

Preferably the part of the said sequence is encoded by a symmetrical block cipher. This is preferred as giving the highest level of security. Alternatively, in fields of use where it is more important to reduce the computational overhead involved in creating the carnet, a keyed hash function might be used. It will be understood that, by contrast with the Millicent proposal discussed above, hashing is used only within the payment server to produce the token values from the stored random number sequence, and does not determine the relationship between the different numbers in the carnet. The security of the system does not therefore rest upon the integrity of the hash function alone.

Preferably in step (d) of the method, the merchant communicates, together with each payment token, an authentication token from a sequence of authentication tokens issues by the payment server.

Although typically there will be greater trust between the vendor and the payment server, there is still a need to provide security for the transactions between these two parties. In the preferred implementation of the present invention, a particular effective approach is to use the same mechanism as that used to generate the payment tokens themselves. Then the payment server issues the merchant with a series of authentication tokens. These authentication tokens may be derived from the sequence of random numbers in the same manner as the payment tokens. The merchant can then return pairs of payment tokens and authentication tokens to the payment server for authentication. The payment server may then automatically update a merchant account record after authenticating a validated payment token and authentication token received from the merchant platform.

Preferably the step of authenticating the digital payment token comprises:

i) attempting to authenticate the digital payment token against a value at a position in the sequence of random numbers stored at the payment server; and ii) when the token is not authenticated in step i), attempting to authenticate the digital payment token against one or more other values in the stored sequence, which other values fall within a predetermined maximum distance from the said position;

and in step (f) the authentication message indicates that the authentication is successful when the token is successfully authenticated in either step (i) or step (ii).

The basic payment mechanism assumes that the user and the payment server are going through their sequences of stored random numbers in step. Sometimes however tokens may arrive at the payment out of sequence, for example because one merchant is slower than another in submitting tokens for clearance. This feature of the invention enables the system to function robustly in these circumstances. Instead of checking only the next in sequence stored random number at the payment server, a sliding window is used to select a range (in terms of sequence position) of stored random numbers. A submitted token can be successfully validated against any stored value falling within the window (provided that stored value has not been previously used).

Preferably the method further comprises:

f) maintaining at the payment server a record of the current state of the set of digital payment tokens; and g) when the digital payment tokens issued to the user are lost or corrupted, communicating data from the payment server to the user and thereby updating the set of digital payment tokens to a state corresponding to that recorded at the payment server.

A further significant advantage offered by preferred implementations of the invention is that if the carnet is destroyed or stolen, then it can be recreated by the payment server.

Preferably the method further comprises:

issuing the user an identification number (PIN);

modifying, using the identification number, the numbers derived from the said stored sequence of random numbers and further modifying, using the identification number, the digital payment token which is transferred to the merchant in step (c).

This preferred feature further enhances the security of the system, without adding significantly to the processing overhead at the merchant platform.

Preferably in the step of modifying the digital payment token, the digitally encoded value issued by the payment server is combined with the identification number using a Boolean logic operation, and the result of the said operation is output as the modified digital payment token. Preferably the said binary logic operation is XOR.

According to a second aspect of the present invention there is provided a method of operating a digital payment transaction system comprising:

a) issuing to a user a set of digital payment tokens comprising a sequence of digitally encoded random numbers b) issuing to a merchant a set of authentication tokens comprising a sequence digitally encoded of random numbers;

c) transferring a digital payment token from the user to a merchant;

d) transferring the said digital payment token, and with the digital payment token transferring an authentication token, from the merchant to a payment server;

e) authenticating the digital payment token and the authentication token against records stored at the payment server; and f) returning an authentication message to the merchant.

The invention also encompasses merchant platforms, client platforms and payment servers for use in the methods of the first and second aspects of the invention, and networks including such devices. In the example described below, the client platform is a personal computer running a web browser. Other examples of client platforms include smart cards and personal digital assistants (PDA's).

BRIEF DESCRIPTION OF THE DRAWINGS

Systems embodying the present invention will now be described in further detail, by way of example only, with reference to the accompanying drawings, in which.

DETAILED DESCRIPTION OF EXEMPLARY EMBODIMENTS

Figure 8:
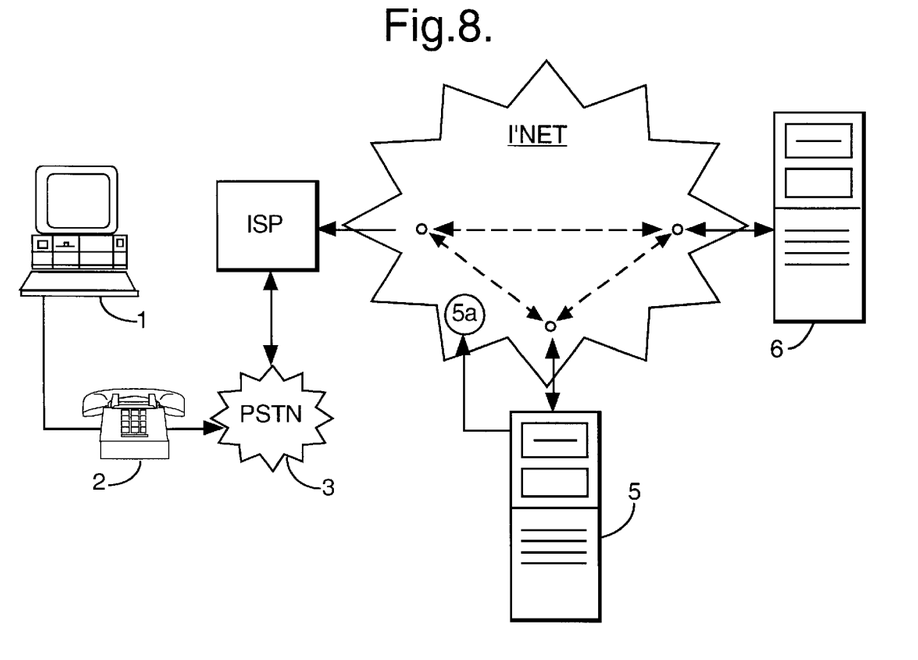
FIG. 8 is a schematic of a network embodying the present invention.

As shown in FIG. 8, a client terminal 1, which in this example is a personal computer, is connected via a modem 2 and the PSTN (public switched telephone network) 3 to an Internet Service Provider (ISP) 4. Via the internet, the client terminal forms, at different times, connections to a payment server 6 (also termed herein the "payment service") and to an on-line merchant 5. The merchant offers a service in return for payment. For example, the merchant may serve HTTP (hypertext transfer protocol) pages of personalised news items at a low, fixed charge per page. Alternatively, the merchant may, for example, control a node 5a which provides access to a high-speed internet connection. Access to the node is made available to the user at a charge which may be calculated, for example, on the basis of the length of time for which the user is connected. Payment tokens may be requested from the user at regular intervals, or a payment token may be collected from each packet which passes through the node. The payment system embodying the present invention is termed by the inventor "QuickPay".

In use a module which is termed the "Carnet" module is installed on the client terminal. This module, which is described in further detail below, includes programs which support interactions with the merchant and the payment service. In addition the terminal stores data relating to any payment tokens which are currently held by the user.

Initially, the user establishes an internet connection with the payment service, and purchases tokens to a certain value. This transaction may be carried out, for example, by transmitting from the client to the payment service a request for tokens to a certain value, say £10, together with a credit card number. This number may be encrypted using any one of a number of public key encryption tools, such as PGP. The payment service debits the relevant sum from the credit card account, and generates a number of payment tokens, say 1000 tokens of value 1p. These are encrypted using the public key algorithm and returned to the user via the internet connection, together with a key which is unique to the user. Each token comprises, in this example, a 64 bit random hexadecimal number, drawn from a large list of n random numbers $R=(r0, r1, r2, \ldots, rn-2, rn-1)$ at the payment service. For each user, the payment service keeps two pieces of secret information k and s. k is a random key for use with a symmetric block cipher. s is a random security parameter, where $(0 \leq s \leq n-1)$ taken at random from the range $(0 \ldots n)$. There is also an integer index variable i. Its secrecy is not essential although it's integrity is important.

The carnet which is stored at the client terminal holds a list of m random numbers $T=(t1, t2, t3, \ldots, tm-1, tm)$, where $(m<<n)$. Table 1 below shows part of the list of random numbers held in the carnet. The payment service derives T from R when the user registers. T is an encrypted subset of R, such that;

$$t_x = E(k, r_{(s+xmodn)})$$

where $E(a, b)$ donates encryption of b using key a. The variable i is initialised to 0 at this point. The carnet also contains a copy of this variable. To make a single micropayment, the user sends ti (the ith payment token) to the payment service. The payment service checks to ensure that $$D(k, t_i) = r_{s+i \bmod n}$$

and the payment succeeds. The carnet and payment service both increment their copies of i.

Subsequently, the user establishes an Internet connection with the merchant. This may be, for example, in order to retrieve HTML pages of news items which have been retrieved by the Merchant using a search engine and search criteria which were previously specified by the user. In response to a request to download the HTML pages, the Merchant requests payment of, e.g., 10p. Typically, the returning of the request for payment will be automated using CGI scripts running on the HTML server at the Merchant.

In response to the request from the Merchant, the user issues the tenth token from the Carnet. Since the tokens are in a determined sequence it is sufficient to transfer, e.g. just the tenth token in lieu of all ten tokens required to make the payment total. This token is modified by the carnet module by an XOR operation with a PIN which the user is required to input at the terminal in order to authorise the issuing of tokens. The modified token is then transmitted on the internet connection to the Merchant.

The Merchant has an open internet connection to the payment service. When the tokens are received from the user, the Merchant transmits to the Payment service a tuple containing the payment tokens, together with a corresponding set of authentication tokens. The Merchant, also termed herein the "third party service provider" (TPSP), is issued with a set of authentication tokens, which are essentially the same as the payment tokens issued to a user, but which function like one-time passwords. The set of authentication tokens A is an encrypted subset of R, such that $$a_x = E(k, r_{s+xmodn})$$

where k is a secret encryption key, s is a random security parameter and n is the size of the random database R. The TPSP collects payment tokens ti from the user as previously described. To verify each token, the merchant forwards the token together with aj (the next authentication token) to the payment service. The payment service verifies that both ti and aj are the expected values before returning confirmation. By counting the (ti, aj) pairs submitted successfully by the merchant, the payment system has a record of the amount that merchant is owed.

The payment service returns an authentication token in the authentication message. If the payment token was submitted by the merchant with authentication token aj, then the payment server returns a(j+1), that is the next authentication token in the sequence held by the merchant, to indicate that authentication was successful. The payment server may transmit the complement of a(j+1) to indicate that authentication has failed.

The messages exchanged by the user, the merchant and the payment server are all short and are suitable for inclusion, for example, in HTTP (hypertext transfer protocol) or MIME (multipurpose internet mail extensions) headers.

The payment system as described so far is potentially open to several types of failure. Mechanisms to handle these are included in this implementation. There are two main classes of recoverable failure:

1) A carnet or merchant module's index variable may get out of step with the payment service's. These errors are handled by a resynchronisation scheme. If a received token does not match it's expected value, the payment service reads forward through the sequence of random numbers looking for a value that does match. A read forward limit is set as a system parameter. If a matching token is found within the range set, the payment system accepts the token. It records the number of tokens skipped for each carnet. A carnet can recover the tokens later (e.g. when the number of tokens remaining gets low) by performing a refresh.

Optionally, this scheme may be elaborated by using a sliding window which defines the range of values against which a token may be elaborated.

2) The list of tokens or the index variable in either a carnet could become lost or damaged. A carnet can be refreshed, making its state consistent with the information held in the payment service. When a carnet is reinitialised, a new set of payment tokens is constructed for the user. The number of tokens is equal to the number of unspent tokens in the previous carnet, plus the number of tokens lost through synchronisation errors.

There is potentially a third type of failure which is not recoverable. Corruption of the payment service's information would be fatal and must be prevented. This is accomplished by building redundancy into the payment service, for example by mirroring data from one payment server at another server at a different site, and by using robust storage technologies such as RAID.

A further feature of the present implementation is that each carnet issued to a user is provided with a digital signature. The signature is formed in a conventional fashion using a public-key encryption algorithm. It is particularly preferred that DSA or another El Gammal variant should be used for this purpose. The digital signature then may be used for dispute resolution. For example, if the user purchases tokens which, as a result of a system failure, can not be spent, then the user may claim a refund from the party who issued the carnet. That party can ensure that the carnet is genuine by checking that the digital signature is that generated when the carnet was issued.

Figure 9:
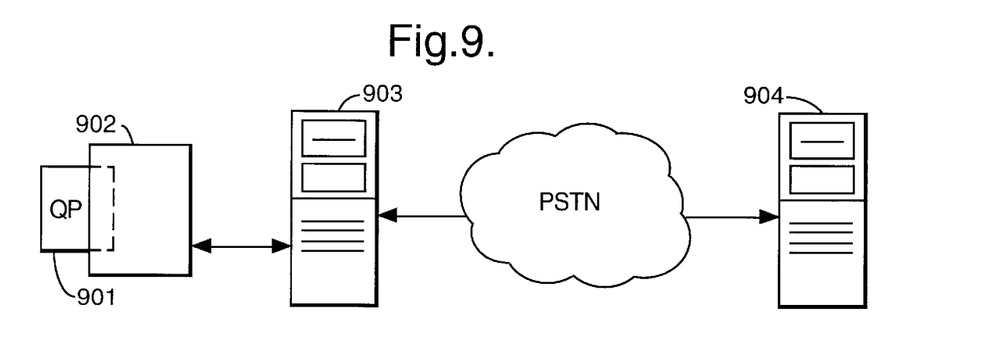
FIG. 9 is a schematic of an alternative embodiment.

It will be understood that the above application of the QuickPay technology is described by way of example only, and that the invention may be used in a wide variety of different contexts, wherever a secure and efficient payment service is required. Although the invention has particular advantages in the context of internet services, because of the low messaging costs, it may also be used in other areas. For example, the carnet and associated client applications might be stored on a smartcard including a microprocessor and non-volatile memory. The merchant platform in this case might be accessed via a card reader at an EPOS (electronic point of sale) terminal. FIG. 9 shows such a system, in which the carnet on a smartcard 901 is in a card reader 902 connected to a merchant platform 903. The merchant platform is connected via the PSTN to the payment server 904. The card might also be used to purchase telephony services via a card reader attached, for example, to a public telephone. In this case, the existing telephony network signalling channels, such as NUP (national user part) and ISUP (ISDN user part) in the UK PSTN, may be used for the connections between the different platforms, in place of TCP/IP signalling in the first example described above.

In a further example, QuickPay is used to pay for use of BT's NetSumm service. NetSumm (Trademark) is a networked text summarisation tool. With it, internet users can produce summaries of English language World Wide Web (WWW) documents. The service is accessed via a Web browser.

The user first visits the QuickPay web site. First they set up an account by completing a form supplying a username and a password. The username should be a valid email address, the password can be any character string up to 64 bytes long. The user then visits a page where they can purchase a QuickPay carnet The user completes another form on which they specify the type of platform they use and the size of the carnet they require. When they click on the 'Buy' button, the payment service creates a new QuickPay carnet and downloads it to the client. The user then installs their new carnet. They can specify the location that the QuickPay client will be installed at and they must supply a PIN to protect the payment tokens. From the NetSumm homepage the user specifies the URL (uniform resource locater, i.e. the address) of a WWW document to be summarised. NetSumm returns a digested version of the document. All hyperlinks in the document are modified so that clicking them returns a summary of the target document. NetSumm also presents additional controls to the user to allow them to change the summarisation rules.

Use of NetSumm is charged at £0.002 (0.2 pence) per summary. Every time a page is submitted, NetSumm charges the user two QuickPay tokens before returning the result (the token value in this example is 0.1p). A single call to the QuickPay merchant module allows the NetSumm application to request these tokens and get a result indicating if the payment was successful or not. Before using NetSumm, the user must run their QuickPay client. This is an application separate from the user's web browser. It has a single small window which gives a visual indication of the number of tokens remaining. The window also contains some controls to allow the user to quit the application, change the PIN, update the carnet etc. If the user fails to start the client before using NetSumm, they will receive an error page from the service when they attempt to summarise a text. The first time the NetSumm service attempts to collect tokens from the QuickPay client, the user is presented with a dialogue box asking them to confirm the payment. They must enter their PIN to unlock the payment tokens and they can choose how to handle any subsequent payment requests from this merchant If the user chooses to allow subsequent payments, NetSumm will be able to collect additional tokens without user intervention. Alternatively, the user may choose to accept or reject each request individually. These rules persist until the user closes the QuickPay client application.

When the user has exhausted their supply of payment tokens, they obtain more by visiting the QuickPay web site, where they follow a 'Refill Carnet' link Refilling the carnet is very similar to purchasing the first one, except that any unused tokens from the previous carnet are added to the user's new one. The user must enter their authentication details (username and password) to purchase additional tokens. They must also provide payment details (i.e. a credit card number) and select the type and size of carnet the want. Any unused tokens from the previous carnet are added to the new one before it is delivered and the user's old carnet becomes invalid.

An implementation of the invention will now be described in further detail.

Figure 1:
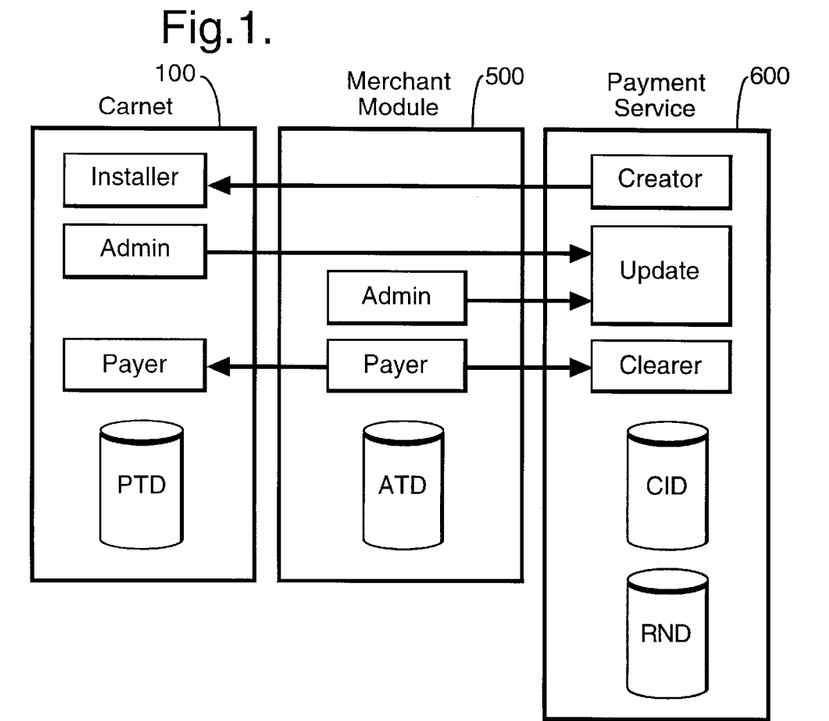
FIG. 1 is a schematic showing the main components of the payment system.

FIG. 1 shows the main software components in this implementation of QuickPay The payment service and merchant module are back end applications, with little or no user interaction. These components are, in this example, implemented as UNIX client and server applications and should run on most UNIX platforms. The carnet does interact with its user and may be implemented in a variety of forms on several types of computer. A generic UNIX client is described here, which may be run on UNIX workstations, or may be used as the basis of stand alone clients ported to other platforms. As a further alternative, the QuickPay client may be integrated with other applications, for example WWW and email clients.

Payment Service

The payment service comprises the clearer, the creator, the updater and four databases.

Databases

All four databases are simple collections of records. In the URD (User Registration Database), entries are indexed by an alphanumeric string (the username). In all other databases the entries are indexed sequentially by number. There is no requirement for the allocation of indices to be contiguous. For example, carnet IDs are allocated at random from the range [0 . . . 264−1] and only a fraction are likely to be allocated at any one time.

User Registration Database

```
struct {
    char passwd[];      /* Password */
    verylong cid;       /* Carnet ID */
}
```

The URD holds information about QuickPay users. Its main use is for authentication of the users who are performing administrative functions.

Entries in the URD contains a password and a carnet ID.

The Carnet Information Database

```
struct {
    verylong key;
    verylong dbid;
    u_long start;
    u_long size;
    u_long index;
    u_long resyncs;
}
```

The CID (Carnet Information Database) holds state information for the user carnets and for the merchant modules. This database is used by the clearer to identify the next expected payment or authentication token. It also allows the updater to reconstruct any set of payment or authentication tokens from the RND. The key is the value used in the keyed hash to construct the tokens. The database ID, start offset and size fields identify the source of the random data in the RND. The token index is the index of the next expected token and lies in the range [0 . . . size]. The resync (resynchronisation) counter is a record of number of tokens that have been skipped in order to clear a received token.

Merchant Information Database

```
struct {
    u_long accepted;
}
```

The MID (Merchant Information Database) holds the record of transactions cleared for each merchant. Where an entry for a carnet in the CID is for a merchant, there is a corresponding entry in the MID.

The Random Number Database

```
struct {
    u_long size;
    verylong tokens [];
}
```

The RND (Random Number Database) holds a pool of random data which is used to construct sets of payment and authentication tokens. Each entry in the database contains a random sequence of 64 bit values. The size field indicates how big this sequence is. The RND is populated with data from a hardware random number generator, as follows: The program RandomCommServer can be divided into three sections. The random generator comes under the source file name Random Generator.cpp with header file Random Generator.h the random tester uses source files Main Tester.cpp, tester.cpp, and Random IO.cpp and uses header files Main Tester.h tester.h, stats.h and Random IO.h. The remaining parts serve as the windows interface and the server. The main source files are RCServerDoc.cpp, ServerSocket.cpp and "CommSocket.cpp".

1. Generating the Data

The random numbers are generated using the a hardware random number generator manufactured by BT and known as Lektor 3900, in blocks of 256K (=2,097,152 bits). The random number generator is a card which fits into a personal computer, and which contains a diode and an amplifier which amplifies shot noise on the diode to create a random stream of binary values. The generator has a slight bias, so to correct this, the data is compressed by changing two bits of data into one bit or no bits. 00s and 11s are discarded, 01 becomes 0 and 10 becomes 1. This means that three-quarters of the data is lost, but the bias is removed. This data is then saved on disk under the name "raw.dat".

2. Testing the Data

The following tests are used on the blocks of 256K (i) Bits Test: tests the number of zeroes against the number of ones.

(ii) Serial Test: tests the frequencies of 00, 01, 10, and 11.

(iii) Runs Test: tests the occurrences of long sequences of 0 . . . 0 or 1 . . . 1.

(iv) Poker Tests of size 2 to 8: tests the occurrences of 2- to 8-bit combinations.

(v) Autocorrelation Test for periods 1 to 1000: tests for periodicity in the data.

(vi) Maurer Universal Statistical Test: looks at the potential for the compression of data.

In addition, the bits test is calculated cumulatively for all the generated data. This checks for an overall bias, which may not be evident in tests of data of only 128K.

3. Acceptance/Rejection of the Data

The data is tested at the 5% and 1% significance levels. This should mean that the number of tests failed at the 5% level should be 1 in 20, and the number at the 1% significance level should be 1 in 100. If the data fails at significantly more of these 1011 tests (80+ at the 5% level, 15+ at the 1%, or 1 "off-the-scale" error) then the data will be rejected. In addition a score of the failures at a particular test will be kept. If one test persistently fails, then this will be flagged.

4. Storage of Data and Use as Server

Once the data has been accepted as genuinely random, the 256K file is split into eight 32K files and stored under the filename "use_n.dat" (where n is a three-digit number). This will be available to any client machine that connects to the server. The server sends out files, using the oldest first. Once a file has been sent to a client, it is deleted from storage. At any one time, up to 1000 32K files will be available to clients. If it is feared that the random data can be accessed while it is being sent, then it is recommended that the client encrypt the received random data.

Creator

Figure 2:
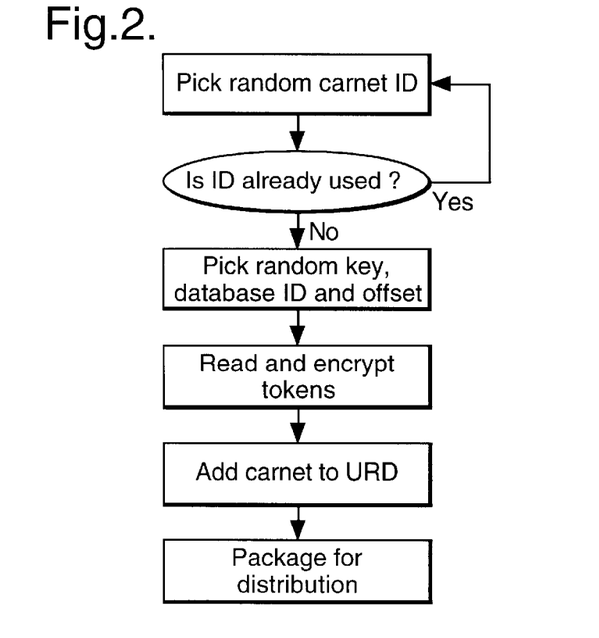
FIG. 2 is a flow diagram showing the main execution loop of the payment service clearer module.

The creator is invoked to create a new carnet for a user. FIG. 2 gives a flow diagram for this process. It assumes that if this is the user's first carnet, an account has already been created in the URD.

The creator picks a new carnet ID, key, database ID and start offset at random and adds these details to the CID. It then reads tokens from the RND, encrypts them using the key and packages them (together with the client software) in an installer for distribution.

Clearer

Figure 3:
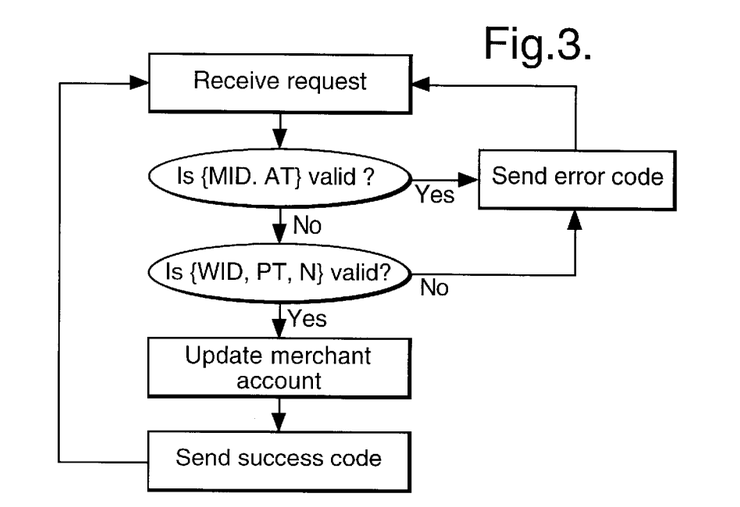
FIG. 3 is a flow diagram showing the main execution loop of the merchant module.
Figure 4:
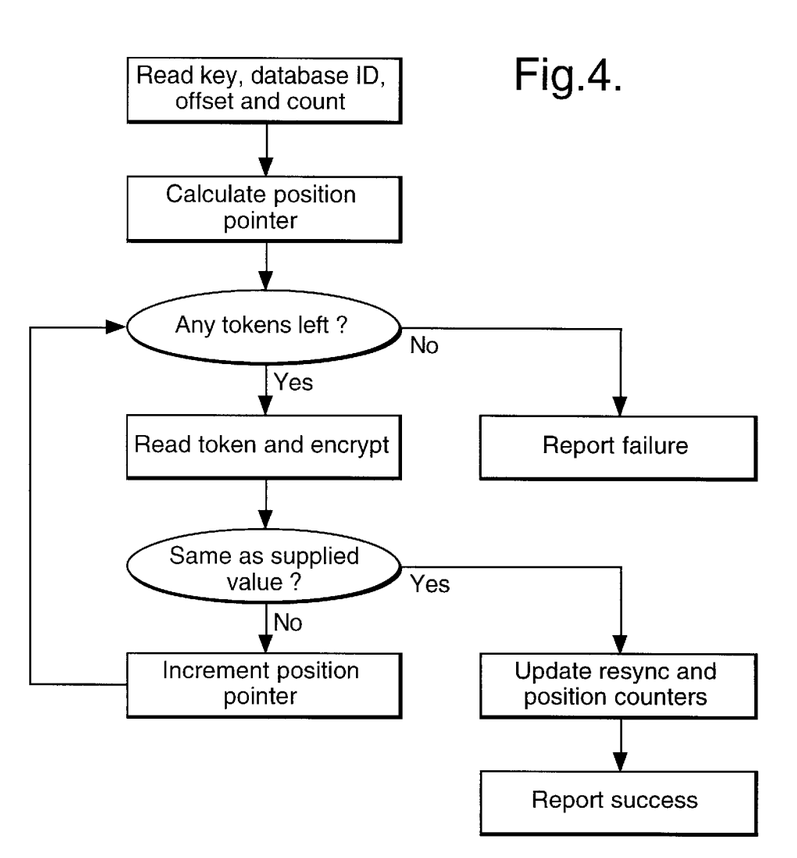
FIG. 4 is a flow diagram showing the process for verifying tokens received at the payment service.

FIG. 3 gives a flow diagram for the main execution loop of the payment service clearer module. Its function is to process payment tokens collected by QuickPay merchants. The clearer listens for requests from merchants on the network. When a request is made, the clearer reads the tuple {im, tm, ic, tc, n }, (where im is the identity of a carnet at the merchant, tm is a token from that carnet at the merchant, ic is the identity of a carnet at the client, tc is a token from that carnet at the client and n is the number of tokens from the client) and checks that it is properly formatted. The clearer ignores improper requests. The clearer checks {im, tm} and {ic, tc, n} (see below). If both of the checks are passed, the payment service increments the accounting record for the merchant to indicate the acceptance of another n tokens. An authentication message is returned to the merchant. Optionally, the authentication message may take the form of the next in a sequence of authentication tokens previously issued to the merchant. The complement of the token value may be transmitted when authentication has failed. FIG. 4 describes the process of verifying the {i, t} or {i, t, n} tuple. The clearer starts by reading the key k, database ID d, start offset s and token counter c from the CID. Using s, c and n, the clearer determines the position of the next expected token for the carnet within the raw database d. It reads this token and forms the keyed hash using k. If the result is the same as the supplied value, the token is accepted.

Sometimes, the condition will arise where the index pointer in the carnet gets ahead of that in the payment service. This happens as a result of tokens being collected but not cleared. The clearer has a mechanism for dealing with this problem. If the first token retrieved from the RND does not match the clearer searches forward, trying the next token, then the next and so on. The clearer will accept a token which matches within 100 attempts (this figure is variable according to the needs of a particular implementation). For every token in the RND which is skipped, the clearer increments the resync counter for the carnet in the CID. The clearer reports the success or failure by returning a numeric code. As noted above, the basic scheme may be made more flexible by the use of a sliding window rather than simply a fixed range forward from the current index pointer at the payment service.

Figure 10:
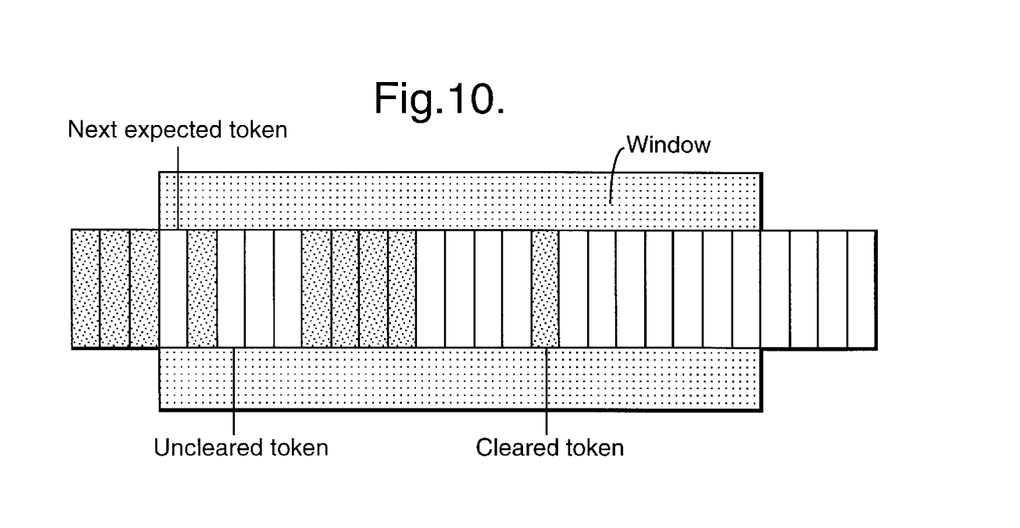
FIG. 10 illustrates the operation of the payment service using a sliding window.

FIG. 10 illustrates the sliding window scheme. The figure shows how the {i, t} and {i, t, n} tuples are verified. The clearer starts by reading the key k, database ID d, start offset s and token counter c for the carnet i, from the CID. The values s, c and n are used by the clearer to determine the position of the next expected token for the carnet within the raw database d. It reads this token and forms the keyed-hash using k. If the result is the same as the supplied value t, the token is accepted. To allow for some slight re-ordering of transactions, the clearer maintains a transaction window surrounding the position of the next expected token. Instead of simply testing the value at this position, the clearer will accept a token if it occurs anywhere within the window.

Initially, the window begins at the position of the next expected token. If transactions arrive out of sequence, the clearer searches forward within the window in an attempt to clear the token. If a match is found the clearer records the fact that a particular token has been cleared to prevent double spending. Positions in the stored sequence which correspond to cleared tokens are shown shaded in the Figure. The size of the window is a configurable system parameter. The clearer must store a flag to indicate the state of every token within the window, so the size of the window influences the storage requirements of the clearer.

As tokens are spent, the window moves forward along the list of numbers in the raw database. The window moves under two situations;

1. As tokens are cleared at the back of the window.
2. When the clearer must search forward beyond the front of the window to clear a token.

In the case of (2), tokens are lost at the back of the window as the window moves forward. The clearer additionally maintains a count of tokens lost in this way (the resync count).

Optionally, an implementation of the QuickPay system may opt not to use windowing by configuring a window size of 1. In this way the clearer avoids maintaining state flags for items in the window, but is unable to clear transactions out of sequence.

Updater

Figure 5:
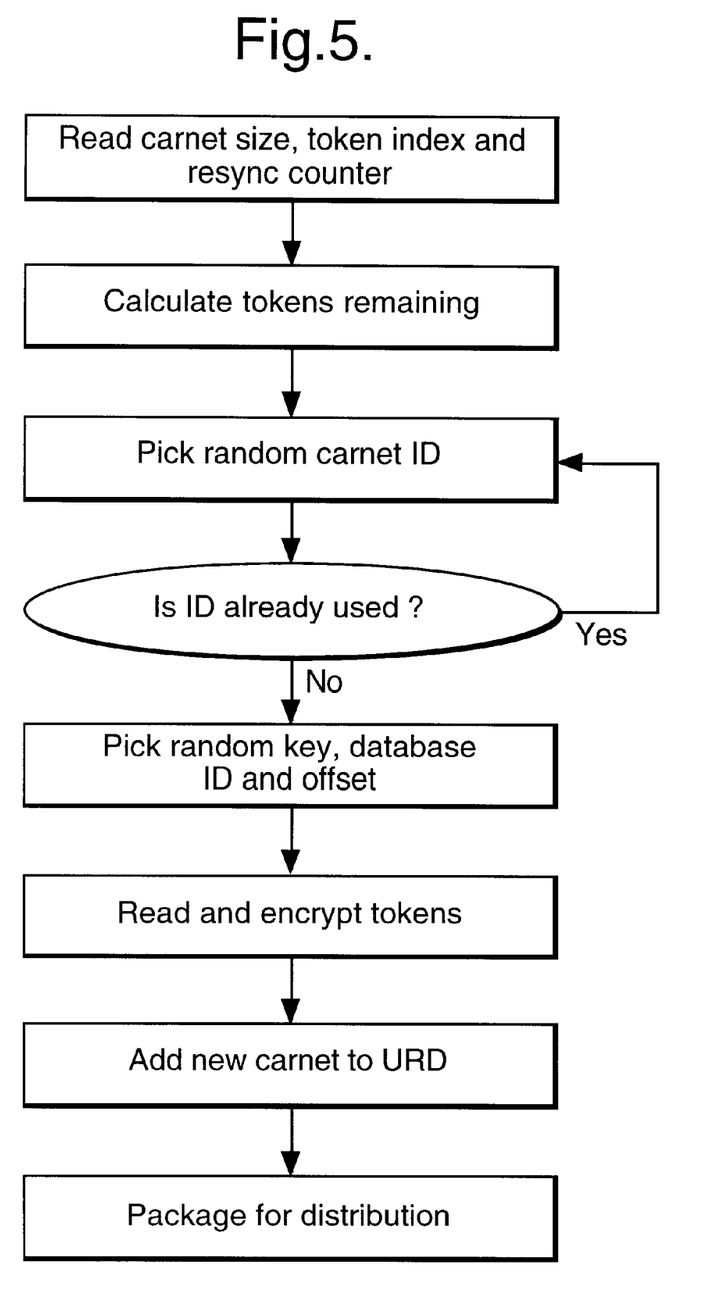
FIG. 5 is a flow diagram showing the updater module used to restore a client or merchant token database.

The updater is similar to the creator, except that it rebuilds carnets from existing entries in the URD and CID. It is used to restore a client or merchant's token database should it become damaged or out of sync with the payment service. The updater can also be used to recover tokens dropped (never cleared) by the payment service. FIG. 5 gives a flow diagram for the updater. The updater reads the carnet size s, token counter c and resync counter r from the CID. It calculates the number of tokens remaining and generates a new key, database ID and start index. The rest of the algorithm is as for the creator.

Merchant Module

The merchant module comprises the collector, administration functions and the authentication token database.

The Collector

Figure 6:
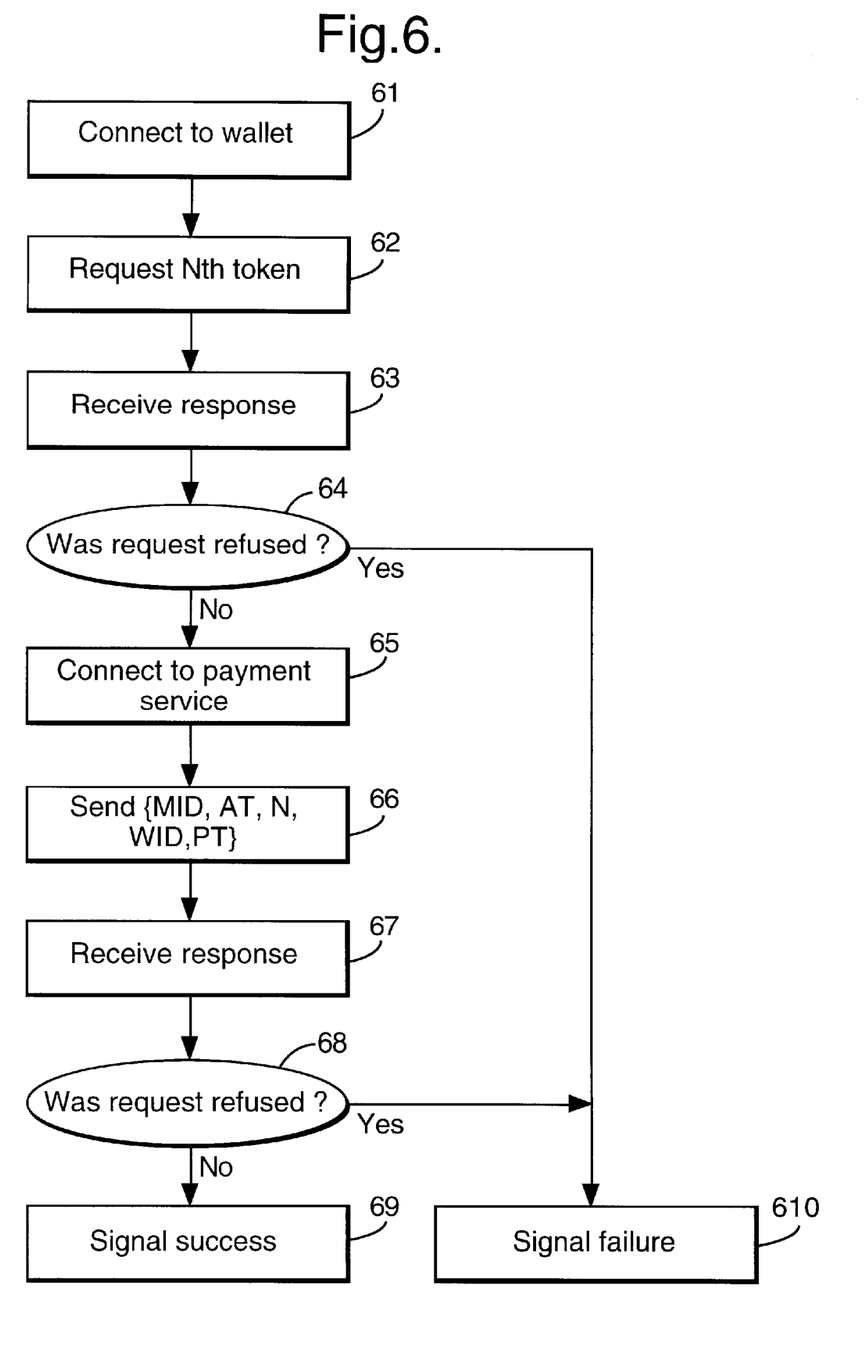
FIG. 6 is a flow diagram showing the collector module at the merchant.

The collector is invoked when the merchant wishes to collect a payment from a user's carnet. FIG. 6 gives a flow diagram for the execution of the collector. In step 61 the collector module establishes a connection to the wallet in the Payer module (described below). In step 62 the Nth token is requested from the Payer, where N is determined by the number of tokens required to give the necessary monetary value for the transaction. In step 63 the response from the Payer is received. The response is tested in step 64, and if the request was refused then failure is signalled in step 610. Otherwise, in step 65 the merchant connects to the payment service. In step 66 the tuple containing the following values is transmitted: Merchant ID (MID), Authorisation token (AT), N, Wallet ID (WID), Payment Token (PT). In step 67 a response from the payment server is received and in step 68 this response is tested. If the request for authorisation is not refused, then in step 69 success is signalled to the Payer. Otherwise, if the request for authorisation was refused, then in step 610 failure is signalled.

Administration Functions

The merchant module includes administration functions. These maintain a count of how many unused authentication tokens remain, and send a request for further tokens to the payment service when that number falls below a predetermined threshold.

Carnet

The carnet comprises the payer, the payment token database and the administration functions. There is also an installer responsible for initial installation on the client's platform.

The Payer

Figure 7:
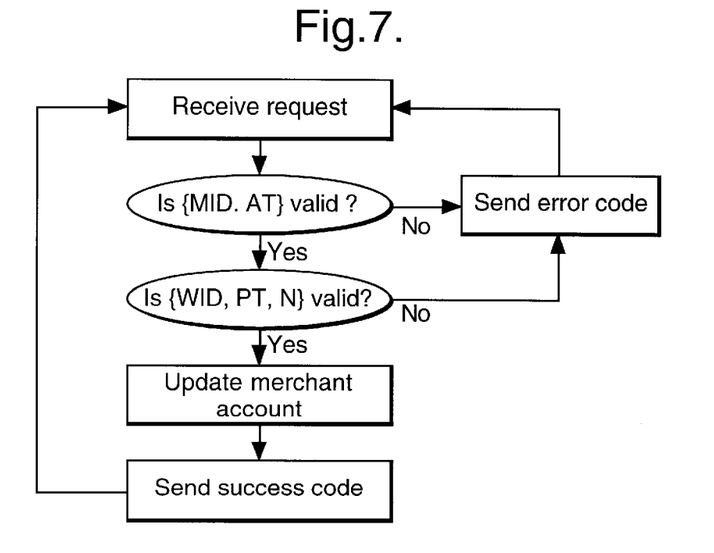
FIG. 7 is a flow diagram showing the payer module in the carnet.

The payer is responsible for handling requests for payment tokens. It receives requests from the network and decides whether to honour them. This decision is based on a number of factors, including user input, the number of tokens remaining and the history of previous transactions. FIG. 7 gives a flow diagram for the payer.

Administration Functions

As for the merchant module, the carnet includes a mechanism for refreshing the carnet and adding new tokens. In addition, the payment tokens stored on the user's machine are protected by a PIN (personal identification number).

The Installer

The installer sets up the QuickPay client on the user's machine. It creates a number of files and directories and allow the user to PIN-protect the newly installed payment tokens. The QuickPay client in this example is distributed as a compressed tar file for UNIX systems

TABLE 1

| Wallet ID | 0xbfb0a569fcbc61f0 |
|---|---|
| 0 | 0x502a1d6c3351d07c |
| 1 | 0xc30ce637bd6091b3 |
| 2 | 0x6420dda77f68a7db |
| 3 | 0x85e354f3229f48f1 |
| 4 | 0x81399aa9cb5a87ae |
| 5 | 0x26c5724d56794a57 |
| 6 | 0xccf8b8add7765a7f |
| 7 | 0x4ab802396f89d6ed |
| 8 | 0x5f9a820ce1e667e7 |
| 9 | 0x1e5a225186e01181 |
| 10 | 0xa32cd70d233c50d7 |
| 11 | 0x956e712aaa29cf4d |
| 12 | 0xb92d9eecad3f16ec |
| 13 | 0x11493c8bfcee102e |
| 14 | 0xa870480af34d6778 |
| 15 | 0x9cc5f5945e153bba |
| 16 | 0xb6abd8c968c47312 |
| 17 | 0x7cfb9ab0555c58c5 |
| 18 | 0x1051e7a417766c01 |
| 19 | 0x5d5e95685bc01249 |

What is claimed is:

1. A method of operating a digital payment transaction system, said method comprising:
   a) storing at a payment server a sequence of random numbers;
   b) issuing to a user a set of digital payment tokens comprising a sequence of digitally encoded random numbers, said set of digital payment tokens being derived from the stored sequence of random numbers by selecting part of said stored sequence and encoding said part of said stored sequence with a key which is specific to the user;
   c) transferring a payment token from the user to a merchant platform;
   d) transferring from the merchant platform to the payment server the payment token received from the user in step (c);
   e) at the payment server, authenticating the token by comparing the value of the random number of the token from the merchant platform and a value derived from a corresponding position in the stored sequence of random numbers; and
   f) subsequently communicating an authentication message from the payment server to the merchant platform.

2. A method according to claim 1, in which the payment server is remote from the merchant platform and the merchant platform communicates over a communications network with payment server.

3. A method according to claim 1, in which the part of the said sequence is encoded by a symmetric block cipher.

4. A method according to claim 1, in which the user is remote from the merchant platform and in step (c) transfers the payment token to the merchant platform via a communications network.

5. A method according to claim 1, in which the step of authenticating the digital payment token comprises:
   i) attempting to authenticate the digital payment token against a value at a position in the sequence of random numbers stored at the payment server; and
   ii) when the token is not authenticated in step i), attempting to authenticate the digital payment token against one or more other values in the stored sequence, which other values fall within a predetermined maximum distance from the said position;
   and in which in step (f) the authentication message indicates that the authentication is successful when the token is successfully authenticated in either step (i) or step (ii).

6. A method according to claim 1, in which in step (d) the merchant communicates together with the payment token an authentication token from a sequence of authentication tokens issued by the payment server.

7. A method according to claim 6, in which the payment server automatically updates a merchant account record after authenticating a validated payment token and authentication token received from the merchant platform.

8. A method according to claim 1 further comprising:
   f) maintaining at the payment server a record of the current state of the set of digital payment tokens; and
   g) when the digital payment tokens issued to the user are lost or corrupted, communicating data from the payment server to the user and thereby updating the set of digital payment tokens to a state corresponding to that recorded at the payment server.

9. A method according to claim 1 further comprising:
   issuing the user an identification number (PIN);
   modifying, using the identification number, the numbers derived from the said stored sequence of random numbers;
   and further modifying, using the identification number, the digital payment token which is transferred to the merchant in step (c).

10. A method according to claim 9, in which, in the steps of modifying and further modifying the digital payment token, the digitally encoded value derived from the stored sequence of random numbers is combined with the identification number using a Boolean logic operation.

11. A method according to claim 10, in which the said Boolean logic operation is XOR, and, when the same identification number is used in the steps of modifying and future modifying, the step of further modifying the digitally encoded value recreates the original value derived from the said stored sequence of random numbers.

12. A method of operating a digital payment transaction system comprising:
   a) issuing to a user a set of digital payment tokens comprising a sequence of digitally encoded random numbers
   b) issuing to a merchant a set of authentication tokens comprising a sequence of digitally encoded of random numbers;
   c) transferring a digital payment token from the user to a merchant;
   d) transferring the said digital payment token, and with the digital payment token transferring an authentication token, from the merchant to a payment server;
   e) authenticating the digital payment token and the authentication token against records stored at the payment server; and
   f) returning an authentication message to the merchant.

13. A method according to claim 12, in which the step of authenticating the digital payment token comprises:
   i) attempting to authenticate the digital payment token against a value at a position in a sequence of random numbers stored at the payment server; and
   ii) when the token is not authenticated in step i), attempting to authenticate the digital payment token against one or more other values in the stored sequence, which other values fall within a predetermined maximum distance from the said position;
   and in which in step (f) the authentication message indicates that the authentication is successful when the token is successfully authenticated in either step (i) or step (ii).

14. A method according to claim 1, in which an authentication token is returned by the payment server with the authentication message.

15. A method according to claim 14, in which the said authentication token corresponds to one of a plurality of authentication tokens previously issued to the merchant.

16. A merchant platform for use in method according to claim 1, the merchant platform comprising:
   means for receiving from a user a digital payment token which comprises a digitally encoded random number
   means for transferring the digital payment token to a payment server; and
   means responsive to an authentication signal issued by the payment server when the said digital payment token is successfully authenticated.

17. A merchant platform according to claim 16, further comprising a store programmed with a sequence of authentication tokens issued by the payment server, in use an authentication token being returned to the payment server with each digital payment token.

18. A payment server for use in a method according to claim 1, the payment server comprising
   a data store programmed with a sequence of random numbers
   means for issuing digital payment tokens which comprise a sequence of digitally encoded random numbers derived from the sequence in the data store
   means for receiving digital payment tokens returned by a merchant platform;
   means for authenticating the returned digital payment tokens; and
   means for outputting an authentication message to the merchant platform.

19. A client platform for use in a method according to claim 1, the client platform comprising;
   means for receiving from a payment server which is remote from the client platform digital payment tokens which comprise a sequence of digitally encoded random numbers;
   a token store for storing the said digital payment tokens; and
   payment means for issuing a token from the sequence to a merchant platform.

20. A communications network including one or more of a merchant platform according to claim 16,
   said payment server comprising:
   a data store programmed with a sequence of random numbers;
   means for issuing digital payment tokens which comprise a sequence of digitally encoded random numbers derived from the sequence in the data store;
   means for receiving digital payment tokens returned by a merchant platform;
   means for authenticating the returned digital payment tokens; and
   means for outputting an authentication message to the merchant platform, and
   said client platform comprising:
   means for receiving from a payment server which is remote from the client platform digital payment tokens which comprise a sequence of digitally encoded random numbers;
   a token store for storing the said digital payment tokens; and
   payment means for issuing a token from the sequence to a merchant platform.

\* \* \* \* \*